No. 696,366. Patented Mar. 25, 1902.
E. KEMPSHALL.
GOLF BALL.
(Application filed Dec. 18, 1901.)
(No Model.)

Witnesses:
Fred. E. Maynard.
B. C. Stickney.

Inventor:
Eleazer Kempshall.
By his Attorney,
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

GOLF-BALL.

SPECIFICATION forming part of Letters Patent No. 696,366, dated March 25, 1902.

Application filed December 18, 1901. Serial No. 86,346. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in Golf-Balls, of which the following is a specification.

This invention relates to balls such as used in golf and other games; and its object is to produce a ball of improved quality and increased efficiency, and especially to enable it to carry far when given a hard blow, without being unduly sensitive to a light blow. I produce a durable ball which is capable of absorbing from an implement a great momentum and which has uniform action, so that a given blow always produces practically the same result, thus conducing to reliability and accuracy of action. In practice I construct the ball with a core of gutta-percha, an envelop of soft rubber, and a shell of celluloid.

Figure 1:
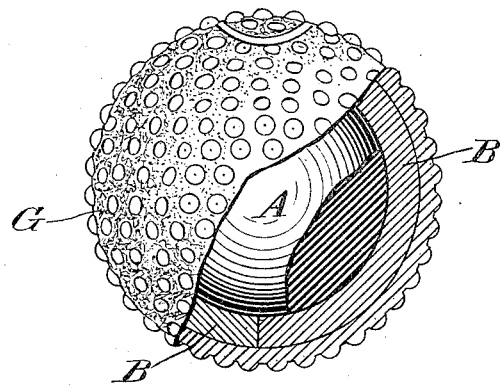
Figure 2:
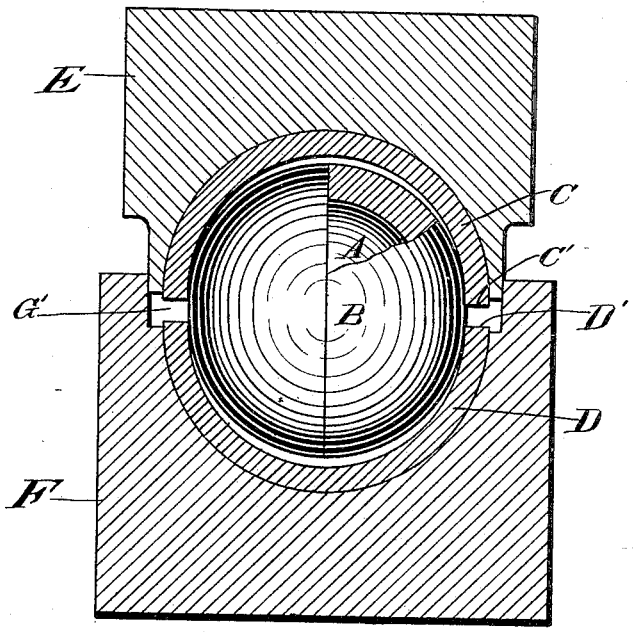

In the drawings forming part of this specification, Figure 1 is a view of a finished ball made in accordance with my present improvements, portions thereof being broken away, so as to exhibit its construction; and Fig. 2 is a diagrammatic view illustrating the manner of compressing a shell upon an inner ball.

In the several views similar parts are designated by similar letters or characters of reference.

Upon a large gutta-percha sphere A, whose diameter is preferably two-thirds that of the finished ball, I place hemispheres B B, of soft rubber which is preferably highly vulcanized and of a firm texture. Said hemispheres taken together form a yielding envelop for the core, and, if desired, their edges may be caused to adhere, so as to form a complete hollow sphere upon the core. The ball thus formed is placed between hemispherical segments C and D, Fig. 2, formed in this instance of celluloid in a suitable condition, preferably somewhat green or not completely cured, and these assembled parts are placed between forming-dies, as E and F, whereupon the dies are brought together by means of suitable mechanism, whereby the shells (which are preferably too large to fit snugly in the dies) are forced together until their edges are in intimate contact, preferably effecting a weld. The material of the half-shells is cemented or otherwise put in proper condition for the adherence of their edges under pressure, and when required the dies may be heated by steam or otherwise for bringing the material of the segments into suitable condition and consistency for compressing and uniting them and completing the ball, as at G, Fig. 1. If desired, the outer surface of the envelop B, or the inner surface of the shell-segments, or all of said surfaces, may be first given an application of suitable material or otherwise treated or prepared so that the shell may be caused to cling or adhere more tenaciously to the said envelop B.

The abutting edges of the original segments at C' and D' may be made somewhat full, thereby to furnish material for properly forming the joint between them as they are subjected to the final compression, at which operation the ball is finally shaped, and at the same time the material of the shell is compressed between the dies and the resisting center piece within the shell. The center piece is first prepared somewhat over size, and when the shell is compressed and welded over the same the resistance of the center piece while under such compression furnishes a substantial support for sustaining the shell against the pressure of the forming-dies. The latter are preferably telescopic and effective to force back into the shell such material as may squeeze out at first between the approaching die-faces at G'. The shell is allowed to cool before the completed ball is removed from the dies. The compressing and heating solidifies and toughens the celluloid, so that it becomes highly resistant or springy and practically indestructible and also places the center piece of the envelop B B under compression. The rubber envelop being highly vulcanized is enabled to withstand the heat applied in forming the shell thereon. The envelop B is preferably thicker than the shell G, and the hard core A is preferably of such size as to constitute the body or main portion of the ball. It is to be understood that in case condensation of the bulk of the core A or of the spherical envelop B takes place at the operation of compressing the shell upon said envelop it is due to the presence of air-spaces or impurities in the material. It is not essential that either the core or the envelop be always condensed in bulk so long as the envelop, with its core, is powerfully gripped by the shell or so long as the envelop is squeezed or compressed between the core A and the shell G. Thus it will be seen that the envelop B is compressed between the hard core A and the hard shell G, the latter being in a state of longitudinal tension, due to the constant outward pressure of said envelop. The shell G is preferably somewhat thick, tending to avoid denting or violent distortion thereof at one point when sharply struck and to diffuse the distortion over a comparatively large area, thus minimizing consumption of power in changing and rechanging the form of the ball and also, as will be manifest, calling into action a large portion or all of the mass confined within the shell and causing it to coöperate effectually with the latter in instantly restoring the ball to normal form. It will also be understood that the outward pressure of the mass B has the usual effect of constantly tending to maintain the shell G in a true spherical form, and hence aids materially in the instant restoration of the shell to its spherical shape after a blow. In other words, the alteration of the shell from its true spherical form diminishes its interior capacity, hence putting under further compression every portion of the mass confined therewithin, including the elastic core A, and since every particle of the imprisoned mass actively opposes such compression the original form of the shell is regained while it is still in contact with the implement, with the result that the ball flies a long distance. Moreover, this very opposition of the confined mass to further compression renders it of especial value as a support or backing for the somewhat frangible material of the shell, inasmuch as by effectively opposing violent distortion at any particular point it prevents the shell from denting sharply enough to produce a crack or rupture, thus improving the capacity of the ball for withstanding harsh usage. It will also be understood that the resilient and rupture-proof characteristics of the ball are greatly augmented by reason of the compressed condition of the envelop B, since it is rendered unnecessary for the shell to yield to a great depth in order to set up in the confined mass a degree of compression sufficient to properly support the shell against a blow. In other words, the first effect of a blow upon a playing-ball is usually to compress the material thereof until the limit of compression is reached, so that thereafter the implement can only impart momentum to the body of the ball without further distortion of the same; but by having the thick inner envelop B in an initial state of compression the preliminary work of compression to be performed by the implement is materially reduced and the time during which the implement is occupied in compressing the ball is shortened, with the result that it is enabled more effectively to impart momentum directly to the ball, while better opportunity is afforded for the elasticity of the ball to come into play before it leaves the implement. It will also be understood that when the ball is struck lightly by an implement it does not respond to the blow with so much promptness as to render the ball too springy for short drives or plays. In other words, when given a very light blow it acts more like a dead ball; but when given a severe blow it exhibits pent energy.

Although other material than celluloid and even material not analogous thereto may be employed for the shell, still I prefer celluloid. The celluloid shell, it will also be understood, is smooth, and hence offers a minimum of resistance to the flowing of air over its surface during the flight of the ball and by reason of its slippery nature receives less opposition from the grass through which it is driven during the game. It not only retains its color, but also resists wear and is not easily chipped by an implement or stone against which it may be driven.

In using the term "celluloid" I refer to celluloid compounds generally and do not limit myself to any particular variety of such compound or to any particular grade or mixture of celluloid composition.

The core A not only itself absorbs momentum from the implement, but also by reason of its solidity prevents undue distortion of the envelop B and as well of the shell G, most of the force going from the implement to the ball being hence utilized to impart velocity thereto. It will also be understood that under the shock of a blow the solid core, if slightly displaced from its true central position, affects somewhat the material of the envelop G at the opposite side of the ball from the implement and also affects other portions of the envelop, so that by reason of such displacement a large amount of the material of the envelop is called into action and powerfully reacts, thereby imparting a higher degree of activity or liveliness to the ball and causing the same to leave the implement at higher velocity.

An important advantage of my invention resides in the durability of the ball, since for the envelop B, I employ rubber of firm texture and highly vulcanized, and hence not liable to deterioration, so that the ball not only withstands severe usage, but remains in its original elastic condition for a long time and remains intact even if the shell is destroyed. Moreover, the rubber envelop is heavy in proportion to its bulk, thus enabling considerable weight to be stored in a small shell, thus avoiding air resistance, while having capacity for prolonged flight. Moreover, my improved ball has a uniform solidity or density, and hence the same blow always produces the same result, enabling the user to play to better advantage. The core R is well centered in the envelop and the latter in the shell, so that the ball tends to run true instead of in a sinuous path, as is the case with some playing-balls.

My present improvements are applicable not only to golf-balls, but also, at least in part, to balls for use in playing billiards and analogous games, and it will be understood that the thickness of the shell and also the firmness and relative size of the center pieces may be varied in accordance with the requirements of any particular game or use for which the balls may be employed.

The exterior surface of golf-balls may be pebbled or scored. In Fig. 1 the ball is represented as furnished on the exterior surface with relatively slight elevations of a spherical conformation. In billiard-balls, of course, the outer surface should usually be smooth and spherical.

Many variations in construction, arrangement, and method may be resorted to within the scope of my invention.

In my application filed September 27, 1901, Serial No. 76,814, is described and claimed a playing-ball having a celluloid shell compressed upon a yielding filling or core, and in a divisional application filed by me November 15, 1901, Serial No. 82,385, is claimed the process of making a ball with a celluloid shell. In my other pending application, Serial No. 88,065, filed January 2, 1902, I show a shell compressed upon a solid sphere of soft rubber. The claims herein are limited to novel features of invention not disclosed in said applications.

The herein-described novel process is made the subject-matter of my other pending application, filed January 30, 1902, Serial No. 91,814.

Having described my invention, I claim—

1. A playing-ball comprising a spherical gutta-percha core, a thick solid-rubber envelop, and a hard, wear-resisting shell, the diameter of said core being more than one-half that of the finished ball.

2. A playing-ball comprising a spherical gutta-percha core, a thick solid-rubber envelop, and a hard, wear-resisting shell, the diameter of said core being more than one-half that of the finished ball, and said envelop being thicker than said shell.

3. A playing-ball comprising a spherical gutta-percha core, a hard shell, and a rubber compressed between said shell and said core.

4. A playing-ball comprising a gutta-percha core forming a body or main portion of the ball, a highly-vulcanized thick soft-rubber envelop upon said core, and a shell compressed upon said envelop and holding the latter under compression.

5. A playing-ball comprising a hard core forming the body or main portion of the ball, a thick rubber envelop upon said core, and a shell of celluloid upon said envelop.

6. A playing-ball comprising a hard core, a thick rubber envelop thereon, and a shell of compressed celluloid which holds said envelop under compression.

7. A playing-ball comprising a sphere of solid gutta-percha, a rubber envelop thereon, and a shell of compressed celluloid which compresses such envelop upon said core, the diameter of the latter being at least one-half that of the shell.

8. A playing-ball comprising a large spherical core of gutta-percha, a thick solid envelop of highly-vulcanized soft rubber thereon, and a shell consisting of celluloid segments compressed and welded together upon said envelop and holding the latter under compression.

9. A playing-ball comprising a gutta-percha core, a soft-rubber envelop, and a celluloid shell incasing and adhering to said envelop.

10. A playing-ball comprising a hard core, an envelop of soft rubber thereon, and a shell consisting of welded sections of hard, wear-resisting material incasing said envelop.

11. A playing-ball comprising a hard core, a hard shell, and a solid rubber cushion compressed between said shell and said core.

ELEAZER KEMPSHALL.

Witnesses:
B. C. STICKNEY,
FRED. J. DOLE.